Sept. 4, 1962     M. PERSIA     3,052,495
HIGH FLOORED MOTOR VEHICLE
Filed March 20, 1961     2 Sheets-Sheet 1

Sept. 4, 1962  M. PERSIA  3,052,495
HIGH FLOORED MOTOR VEHICLE
Filed March 20, 1961  2 Sheets-Sheet 2

United States Patent Office 3,052,495
Patented Sept. 4, 1962

3,052,495
HIGH FLOORED MOTOR VEHICLE
Mario Persia, Turin, Italy, assignor to Fiat Societa
per Azioni, Turin, Italy
Filed Mar. 20, 1961, Ser. No. 96,850
Claims priority, application Italy Mar. 22, 1960
2 Claims. (Cl. 296—28)

This invention relates to a high-floored motor-vehicle more particularly suitable for touring and inter-city transport. The motor vehicle is characterized by a combination and arrangement of its component parts such as to afford full and optimum utilization of available space and take care of service requirements by providing a toilet, and a canteen as well as a roomy baggage compartment.

Figure 1:
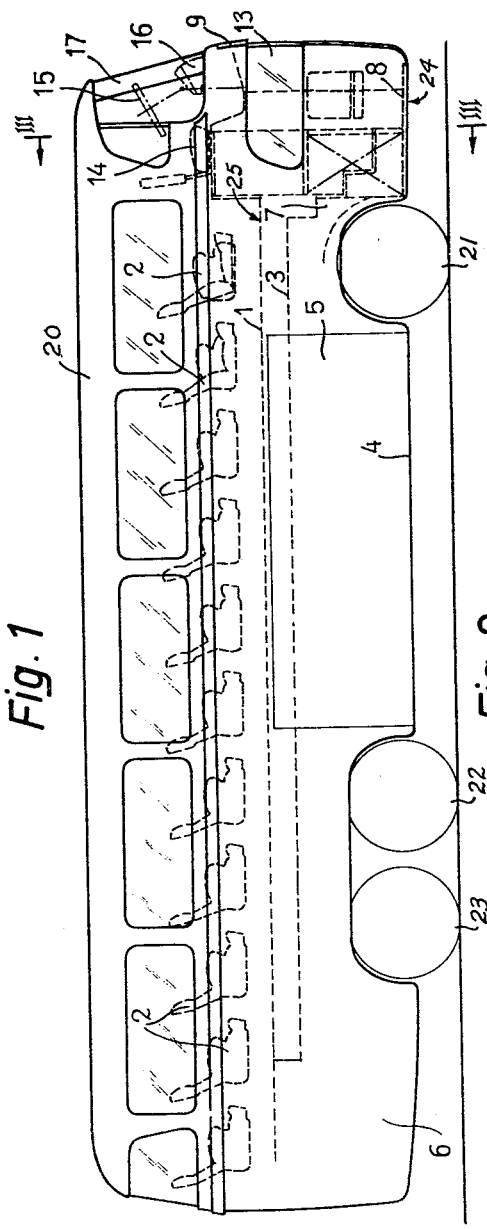
Figure 2:
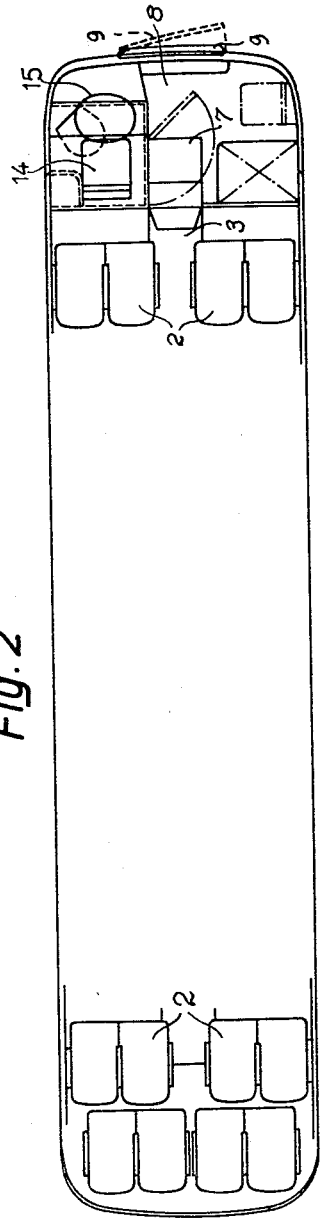
Figure 3:
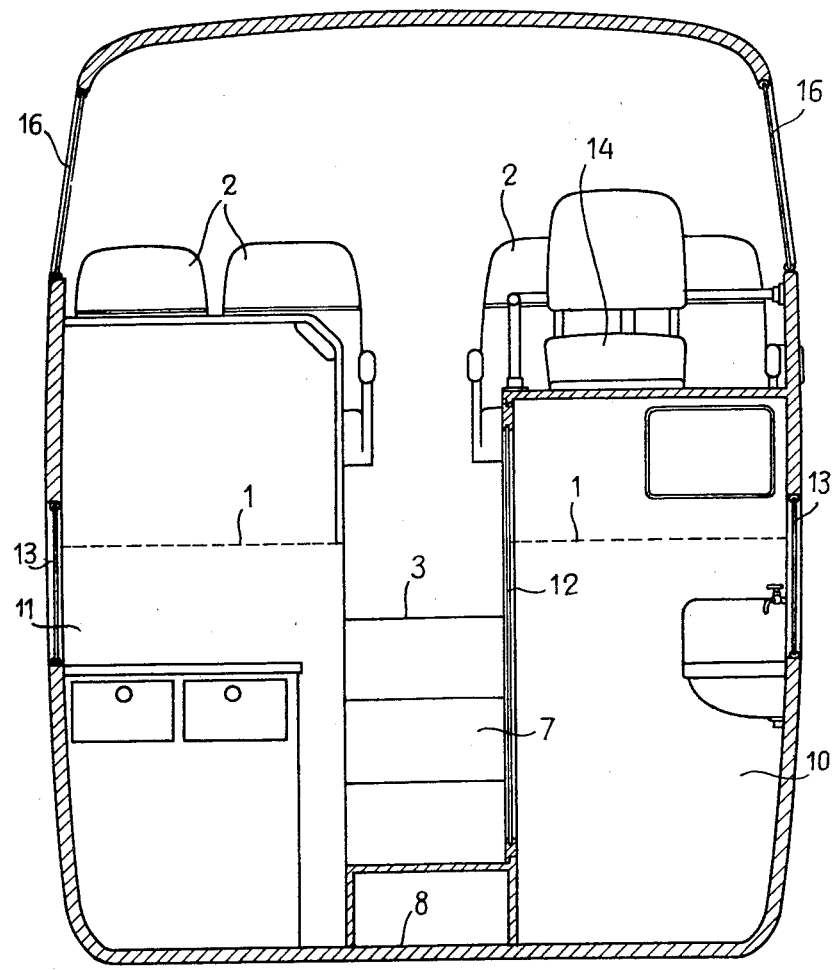

The invention shall be described in detail with reference to the accompanying drawings given by way of a non-limiting example, wherein:

FIG. 1 is a side elevational view;
FIG. 2 is a top plan view and
FIG. 3 is a front sectional view in line III—III of FIG. 1.

The improved motor vehicle comprises a body 20 mounted on a front steering wheel axle assembly 21 and on two rear driving axle assemblies 22, 23. An upper floor 1 and a lower floor 4, both provided with portions extending over the front and rear axle assemblies, are arranged within the body 20, in such manner that a portion 24 of the lower floor 4 extends over the front axle assembly 21 over a greater length than a portion 25 of the upper floor 1. The upper floor 1 includes a depressed central aisle 3 and raised seating decks with seats 2 arranged on both sides of said aisle.

A luggage compartment 5 is arranged between the upper floor 1 and lower floor 4 extending between the front wheel axle 21 and rear wheel axles 22.

A further compartment 6 is provided beneath the floor 1 at the rear of the coach to accommodate the motor and transmission which may be of any type, the engine being, more particularly, for instance of the so-called "sole"-type.

Access to the aisle 3 is afforded by a flight of stairs 7 at the front of the vehicle extending along the longitudinal axis thereof.

The flight of stairs 7 starts from a boarding platform 8 arranged on the extended portion 24 of the lower floor 4, accessible through a door 9 provided at the middle front portion of the vehicle body.

On each side of the flight of stairs 7 two compartments 10, 11 are provided for a toilet and a canteen, respectively, see FIG. 3.

The compartment 11 is directly accessible from the flight of stairs 7, the compartment 10 being provided with a door 12 opening towards the flight of stairs.

A wide window 13 illuminates the compartments 10 and 11. A driver's seat 14, handwheel 15 and instrument board 16 are arranged above the compartment 10, a wide window 17 affords vision to the front and sides.

It will be understood that, the principle of the invention being left unaltered, embodiments and constructional details may be widely varied with respect to the examples described and shown without departing from the scope of this invention.

What I claim is:

1. A high floored motor vehicle, particularly adapted for touring and inter-city service, comprising in combination:
    (a) a vehicle body having a door in the middle of its front portion,
    (b) a front steering wheel axle assembly,
    (c) at least one driving rear wheel axle assembly,
    (d) two floors at different levels, situated within the vehicle body, said floors being provided with portions extending over the front wheel axle, the extended portion of the lower floor being longer than the extended portion of the upper floor,
    (e) a boarding platform arranged on said extended portion of the lower floor in the vicinity of the door,
    (f) a flight of stairs situated centrally on said extended portion of the lower floor and leading from the boarding platform to said extended portion of the upper floor,
    (g) a toilet compartment and a canteen compartment arranged on each side of said flight of stairs,
    (h) an upper floor including a depressed central aisle arranged in continuation of said flight of stairs and raised seating decks on both sides of said aisle, and
    (i) a luggage compartment arranged between the upper and lower floors extending between the front and rear axles of the vehicle.

2. A high floored motor vehicle, particularly adapted for touring and inter-city service, comprising in combination:
    (a) a vehicle body having a door in the middle of its front portion,
    (b) a front steering wheel axle assembly,
    (c) at least one driving rear wheel axle assembly,
    (d) two floors at different levels, situated within the vehicle body, said floors being provided the portions extending over the front wheel axle, the extended portion of the lower floor being longer than the extended portion of the upper floor,
    (e) a boarding platform arranged on said extended portion of the lower floor in the vicinity of the door,
    (f) a flight of stairs situated centrally on said extended portion of the lower floor and leading from the boarding platform to said extended portion of the upper floor,
    (g) a toilet compartment and a canteen compartment arranged on each side of said flight of stairs,
    (h) a driver's seat arranged above one of said compartments,
    (i) an upper floor including a depressed central aisle arranged in continuation of said flight of stairs and raised seating decks on both sides of said aisle, and
    (j) a luggage compartment arranged between the upper and lower floors extending between the front and rear axles of the vehicle.

References Cited in the file of this patent

UNITED STATES PATENTS

| 1,991,535 | Austin | Feb. 19, 1935 |
| 2,691,420 | Fox et al. | Oct. 12, 1954 |
| 2,722,987 | Dean et al. | Nov. 8, 1955 |

FOREIGN PATENTS

| 890,709 | France | Nov. 19, 1943 |
| 893,937 | France | Mar. 6, 1944 |